F. A. SCHUMACHER.
CHICKEN FEEDER.
APPLICATION FILED APR. 22, 1918.
1,287,773.
Patented Dec. 17, 1918.
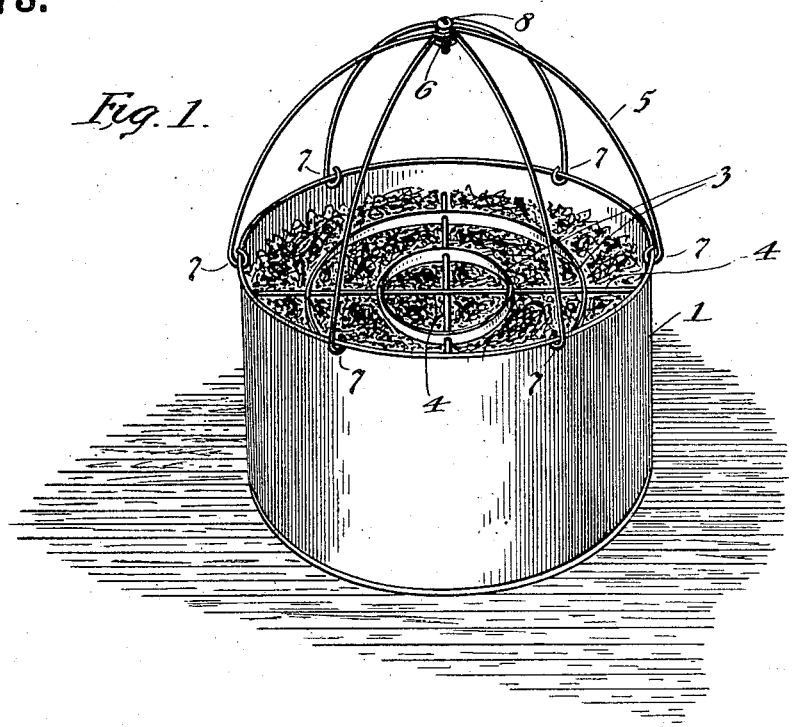
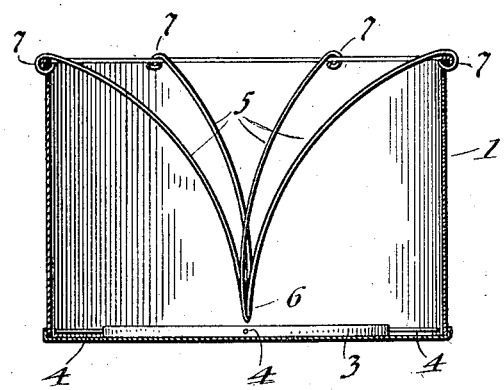
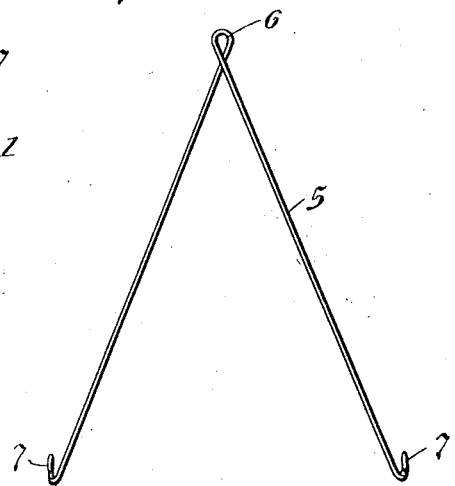
INVENTOR.
Franz A. Schumacher
BY
Jones Addington, Ames & Seibold
ATTORNEYS

UNITED STATES PATENT OFFICE.

FRANZ A. SCHUMACHER, OF EVANSTON, ILLINOIS, ASSIGNOR TO THE QUAKER OATS COMPANY, OF CHICAGO, ILLINOIS, A CORPORATION OF NEW JERSEY.

CHICKEN-FEEDER.

1,287,773. Specification of Letters Patent. Patented Dec. 17, 1918.

Application filed April 22, 1918. Serial No. 229,961.

*To all whom it may concern:*

Be it known that I, FRANZ A. SCHUMACHER, a citizen of the United States, residing at Evanston, in the county of Cook and State of Illinois, have invented new and useful Improvements in Chicken-Feeders, of which the following is a full, clear, concise, and exact description, reference being had to the accompanying drawing, forming a part of this specification.

My invention relates to improvements in chicken feeders, one of the objects of my invention being to provide a container for chicken-feed from which the chickens may extract the feed and which at the same time will prevent the chicken from hopping up on the top of the container.

My invention also provides means whereby the chickens cannot extract the feed in too large a quantity but will be compelled to pick and pull at the feed, thereby causing them to work for their feed and obtain the desired exercise in their feeding.

Another object of my invention is to provide a container having the above desirable characteristics which may be readily shipped and which will take a small amount of space in shipment.

For the purpose of illustrating my invention, I have shown one embodiment thereof in the accompanying drawings.

In said drawings—

Figure 1 is a perspective view of a feeder embodying my invention;

Fig. 2 is a sectional view showing the guard folded inwardly; and

Fig. 3 is a view of one of the bails of the guard.

In the drawings, I have shown the feeder as comprising a container or bucket 1, in which the feed is adapted to be placed. On top of the feed and within the bucket is placed a follower, which, as illustrated, comprises a plurality—in the present instance two—of concentric rings 3, connected and held together by a plurality of cross-bars 4. In the structure shown, these cross-bars pass through holes in the flat rings and are held in position by the friction. However, any other desired manner of forming the follower may be used if desired, the object being to provide a follower cover which, while holding the feed in the container, at the same time will provide sufficient openings to permit the chickens to pick at the food therethrough.

In order to prevent the chickens from hopping up on top of the container, I provide a guard frame, the bars of which are spaced apart a sufficient distance to allow a chicken to get its head into the container and at the same time are close enough together to prevent the chicken from forcing its body therethrough.

These guards preferably take the form of bails 5, each bail forming a pair of guards. These bails are bowed toward the center and are preferably formed as shown in Fig. 3, two bars being formed of a single piece of wire bent back upon itself to form a loop 6 and having the ends turned up at 7 to form pivotal connections with the rim of the container. These eyes 7 pass through openings in the container and thereby form hinged connections between the container and the bails.

In the present instance I have provided three bails, making six bars. The loops 6 at the top of the bails converge and lie one above the other, so that any suitable bolt or screw 8 may be passed therethrough to hold the bails together.

As shown in Fig. 2, for shipping purposes the bolt or nut 8 is removed and the bails, due to their construction, may be folded inwardly into the container 1, thereby providing a small shipping space and also providing means for holding the follower in place during the shipping.

Having thus described my invention, what I claim as new and desire to secure by Letters Patent, is:

1. The combination with a chicken-feed container, of a foraminous follower fitting therein, a plurality of upwardly extending V-shaped two-pronged bars hinged at their diverging ends on the rim of the container and converging at their apexes toward the axis of the container, means for securing said converging ends together, said bars being foldable within the container for shipping and holding, when folded, the follower in the bottom of the container.

2. The combination with a chicken-feed container, of a plurality of upwardly extending frame bars pivoted at intervals to the rim of the container and converging at their tops, and means for securing the converging ends together at a common center, said bars being foldable within the container for shipping.

3. The combination with a chicken-feed container, of a plurality of upwardly extending V-shaped guards having their diverging ends hingedly connected to the rim of the container and having their apexes converging toward the center of the container and secured together at their converging point, said guards being foldable within the container for shipping purposes.

4. The combination with a chicken-feed container, of a frame comprising a plurality of two-pronged frame members, the prongs of each member diverging and hingedly connecting at their diverging ends to the rim of the container, the frame members being bowed and having their apexes connected together at the center, said members being foldable within the container for shipping purposes.

5. The combination with a chicken-feed container, of a plurality of upwardly extending wire bails pivoted at intervals to the rim of the container and converging at their tops, and means for securing the converging ends together at a common center, said bails being foldable within the container for shipping.

6. The combination with a chicken feeder, of a foraminous follewer fitting therein, a plurality of upwardly extending frame bars pivoted at intervals to the rim of the container and converging at their tops, and means for securing the converging ends together at a common center, said bars being foldable within the container for shipping and holding, when folded, the follower in the bottom of the container.

In witness whereof, I have hereunto subscribed my name.

FRANZ A. SCHUMACHER.